United States Patent
Pagani et al.

(10) Patent No.: US 12,457,119 B2
(45) Date of Patent: Oct. 28, 2025

(54) FILE VERIFICATION SYSTEM AND METHOD

(71) Applicant: nChain Licensing AG, Zug (CH)

(72) Inventors: Alessio Pagani, London (GB); Craig Steven Wright, London (GB)

(73) Assignee: nChain Licensing AG, Zug (CH)

(*) Notice: Subject to any disclaimer, the term of this patent is extended or adjusted under 35 U.S.C. 154(b) by 200 days.

(21) Appl. No.: 18/009,317

(22) PCT Filed: May 12, 2021

(86) PCT No.: PCT/EP2021/062620
§ 371 (c)(1),
(2) Date: Dec. 8, 2022

(87) PCT Pub. No.: WO2021/249717
PCT Pub. Date: Dec. 16, 2021

(65) Prior Publication Data
US 2023/0224174 A1    Jul. 13, 2023

(30) Foreign Application Priority Data
Jun. 12, 2020  (GB) ..................... 2008951

(51) Int. Cl.
*G06F 16/22* (2019.01)
*G06F 16/18* (2019.01)
(Continued)

(52) U.S. Cl.
CPC ............ *H04L 9/50* (2022.05); *G06F 16/1805* (2019.01); *G06F 16/2246* (2019.01);
(Continued)

(58) Field of Classification Search
CPC ................. G06F 16/2246; G06F 16/27; G06F 16/1805–1815; G06F 16/1865;
(Continued)

(56) References Cited

U.S. PATENT DOCUMENTS

| 7,895,666 B1 | 2/2011 | Eshghi et al. |
| 2017/0272250 A1* | 9/2017 | Kaliski, Jr. ........... H04L 9/3239 |

(Continued)

FOREIGN PATENT DOCUMENTS

| WO | 2019133568 A1 | 7/2019 |
| WO | 2019195755 | 10/2019 |

(Continued)

OTHER PUBLICATIONS

PCT/EP2021/062620 International Search Report and Written Opinion dated Aug. 16, 2021, 11 pages.
(Continued)

*Primary Examiner* — Robert W Beausoliel, Jr.
*Assistant Examiner* — Nirav K Khakhar
(74) *Attorney, Agent, or Firm* — Messner Reeves LLP

(57) ABSTRACT

A method of using a tree structure overlaid on a blockchain, wherein each node of the tree is a different transaction. The method comprises: inspecting the blockchain to identify at least part of the tree structure, including identifying a target child node which includes a record of a file in the respective payload of that node, and identifying a path comprising one or more edges back through the tree structure from the target child node to the root node. The method then comprises: A) for each edge along the identified path from target child node back to root node, checking that the respective child node is signed by a key associated with the respective parent node, and B) checking that a current instance of the file matches the record included in the target child node. The current instance of the file is verified at least on condition of these checks.

16 Claims, 9 Drawing Sheets

(51) Int. Cl.
  *G06F 16/27*  (2019.01)
  *G06F 21/62*  (2013.01)
  *H04L 9/00*  (2022.01)
  *H04L 9/32*  (2006.01)

(52) U.S. Cl.
  CPC .............. *G06F 16/27* (2019.01); *G06F 21/62* (2013.01); *H04L 9/3247* (2013.01)

(58) Field of Classification Search
  CPC ... H04L 9/0825; H04L 9/0836; H04L 9/3242; H04L 9/3247
  See application file for complete search history.

(56) References Cited

U.S. PATENT DOCUMENTS

| | | |
|---|---|---|
| 2017/0277250 A1 | 9/2017 | Kaliski, Jr. |
| 2019/0288847 A1 | 9/2019 | Beckmann et al. |
| 2020/0169387 A1 | 5/2020 | Wei et al. |
| 2022/0294608 A1* | 9/2022 | Wright ..................... H04L 9/08 |

FOREIGN PATENT DOCUMENTS

| | | |
|---|---|---|
| WO | 2020021394 A2 | 1/2020 |
| WO | 2020109907 A1 | 6/2020 |
| WO | 2020109908 | 6/2020 |
| WO | 2020051825 | 9/2020 |

OTHER PUBLICATIONS

GB1008951.2 Combined Search and Examination Report dated Oct. 28, 2020, 5 pages.
NChain, The Metanet A Blockchain-based Internet, 2018, pp. 1-18, nChain Limited, United Kingdom.
Jack Davies, Edge Cases: The Metanet Blog, Aug. 12, 2019, pp. 1-11, Medium.com, https://medium.com/nchain/edge-cases-the-metanet-blog-41b608c8fe67.
Unwriter, The Metanet Starts a 4-Dimensional Supercomputer that lives on Bitcoin, Medium.com, Jun. 24, 2019, 23 pages, https://medium.com/@_unwriter/the-metanet-starts-84f255a65782.
Zigbee Alliance, Zigbee The Full-Stack Solution Interlacing all Your Smart Devices, accessed May 20, 2020, 4 pages, Davis, California.

* cited by examiner

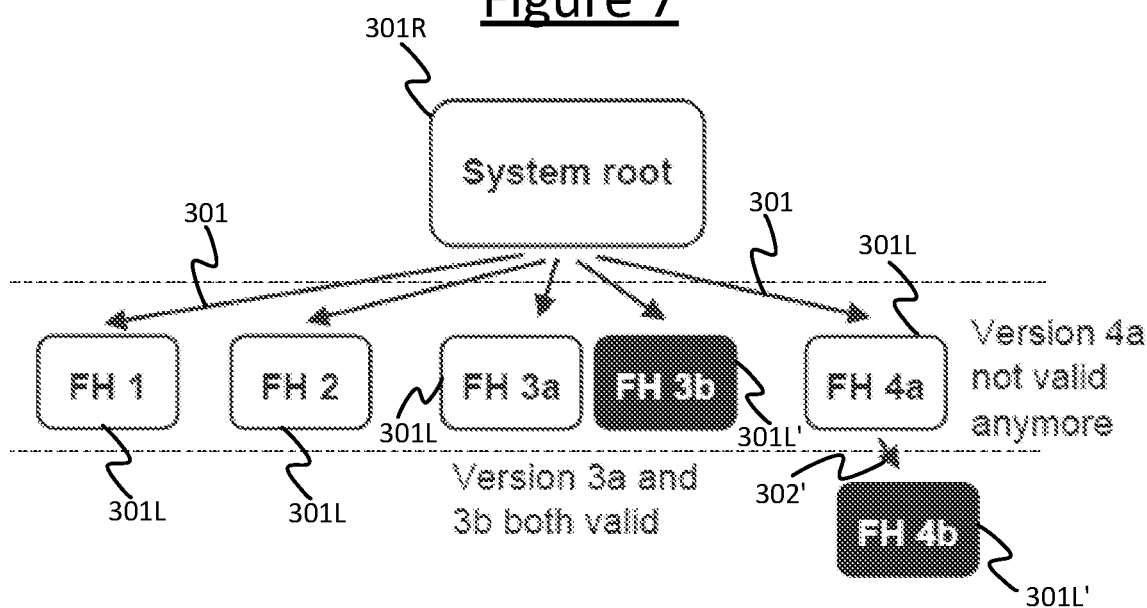
Figure 7
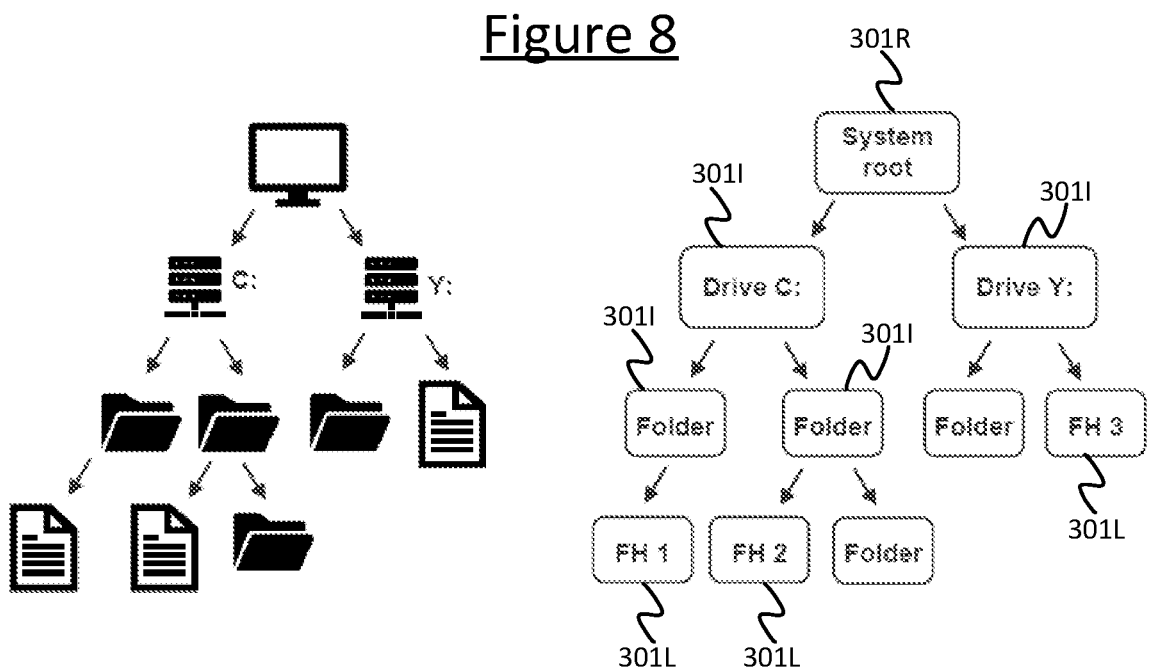
Figure 8

Figure 11

| $TxID_{node}$ | | | |
|---|---|---|---|
| Inputs | | Outputs | |
| Value | Script | Value | Script |
| x BSV | $<Sig\ P_{parent}>\ <P_{parent}>$ | 0 BSV | OP_FALSE OP_RETURN<br><metanet flag><br>$<P_{node}>$<br>$<TxID_{parent}>$<br>Optional parameters used to specialise the node. E.g.:<br><expiry date><br><user ids list><br><permitted operations list><br><file hash><br><file><br><path hash><br><...> |
| | | x BSV | OP_DUP OP_HASH160 $<H_{160}(P_{node})>$ OP_EQUALVERIFY OP_CHECKSIG |

FILE VERIFICATION SYSTEM AND METHOD

CROSS REFERENCE TO RELATED APPLICATIONS

This application is the U.S. National Stage of International Application No. PCT/EP2021/062620 filed on May 12, 2021, which claims the benefit of United Kingdom Patent Application No. 2008951.2, filed on Jun. 12, 2020, the contents of which are incorporated herein by reference in their entireties.

TECHNICAL FIELD

The present disclosure relates to an application of a blockchain whereby a record of data content is stored in a payload of a transaction on the blockchain.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicized. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a pool of ordered and validated pending transactions waiting to be included in a new block of the blockchain. It should be noted that the blockchain may be pruned at some nodes, and the publication of blocks can be achieved through the publication of mere block headers.

The transactions in the blockchain may be used to for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

A blockchain network is already a type of overlay network overlaid on an underlying network such as the Internet. However, it also possible to overlay a further layer of overlay network on a blockchain. An example of this is known as the Metanet. Each node of the Metanet is a different transaction on a blockchain (note "node" is now being used in a different sense, not to refer to a node of the blockchain network but rather a node of the Metanet). Data content and Metanet metadata is stored in a payload of each such transaction, in an unspendable output of the transaction by means of an OP_RETURN. The data content is the actual user content which the Metanet is being used to store, e.g. text, images, video or audio content, etc.; whilst the metadata defines links between Metanet nodes. The links or edges between Metanet nodes do not necessarily correspond to spending edges at the blockchain layer. I.e. if the input of a given Metanet transaction points to an output of another, funding transaction at the blockchain layer, the parent of that same transaction or Metanet node at the Metanet layer is not necessarily the same transaction as the funding transaction. Instead the links or edges at the Metanet layer define links between the data content of the Metanet.

SUMMARY

Operating systems and the like need constant protection from external threats (e.g. virus, malware, spyware) and unintended user behaviours (e.g. unintentional file deletion, configuration changes). Moreover, especially in enterprise environments, software usage might be limited or controlled due to license agreements.

This present disclosure presents a solution based on a graph structure overlaid on a blockchain, such as a Metanet-based graph, that can be used to guarantee software security and data integrity, and to monitor and manage file operations and changes. For instance in embodiments, Metanet-based systems can be designed using a new Metanet protocol referred to herein as the Metanet Tripwire Protocol (MTP). The MTP specifies the operations permitted for a given file (e.g. read, write, execute) and the validity of the file. A system that uses the Metanet Tripwire will only open or execute files certified by the system administrator using a Metanet graph.

According to one aspect of the present disclosure, there is provided a method of using a tree structure overlaid on a blockchain, the tree structure comprising a plurality of nodes and edges between nodes, wherein each node is a different transaction recorded on the blockchain, and each edge connects from a respective child node to a respective parent node, the edges being formed by each transaction comprising a transaction ID and each child node specifying the transaction ID of the respective parent node in a respective payload of the child node, and wherein one of the parent nodes is a root node of the tree structure. The method comprises: inspecting the blockchain to identify at least part of the tree structure, including at least identifying a target one of the child nodes which includes a record of a file in the respective payload of the target child node, and identifying a path comprising one or more edges back through the tree structure from the target child node to the root node. The method then comprises performing checks comprising: A) for each edge along the identified path from the target child node back to the root node, checking that the respective child node is signed by a key associated with the respective parent node, and B) checking that a current instance of the file matches the record included in the target child node. The current instance of the file is verified at least on condition that checks A) and B) are positive.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 7 schematically illustrates a Metanet tree used to store and update file hash nodes (FH) in accordance with embodiments disclosed herein, wherein a node is valid only if it has no children; and FIG. 8 schematically illustrates a file system folder structure (on the left) and a replicated structure using Metanet folder nodes (on the right) in accordance with embodiments disclosed herein. Drive C: and Y: are stored on-chain as folder nodes.

FIG. 11 schematically illustrates an example structure of a Metanet tripwire node in accordance with embodiments disclosed herein. The list of optional features in not exhaustive.

DETAILED DESCRIPTION OF EMBODIMENTS

Example System Overview

Figure 1:
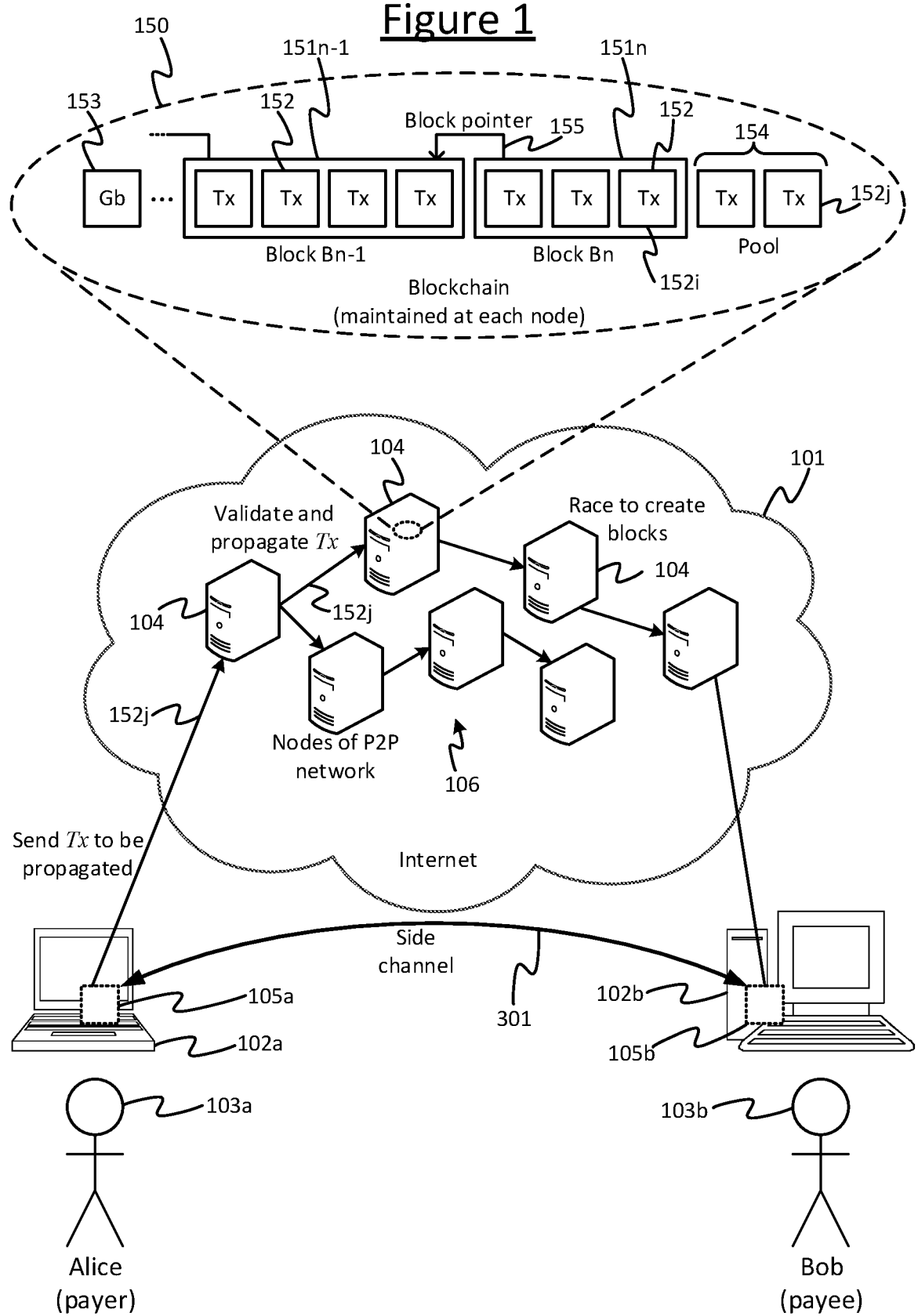
FIG. 1 is a schematic block diagram of a system for implementing a blockchain.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered pool 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "mining fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users, each of which may be an individual user or an organization. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorize (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
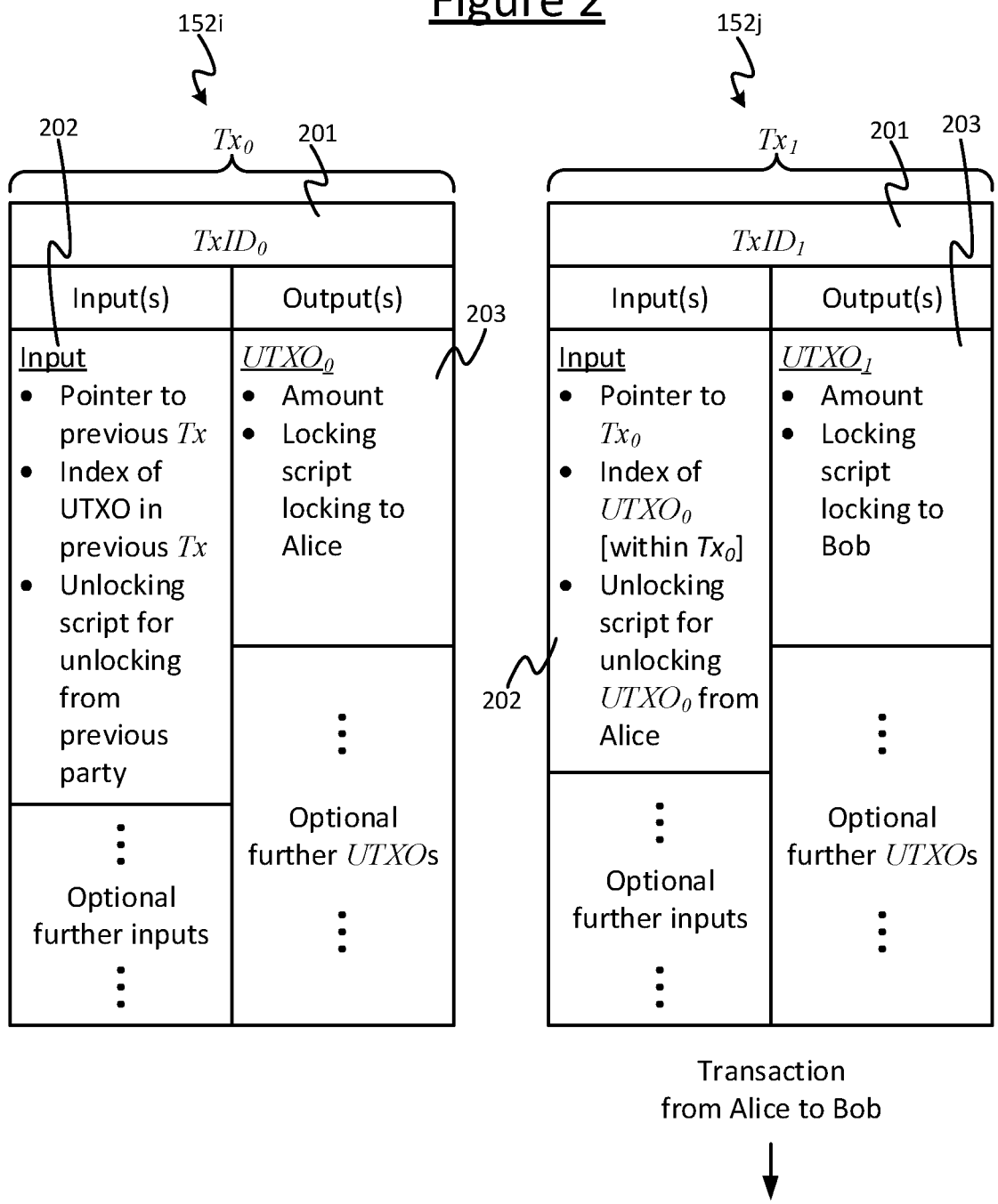
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_2$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing UTXO₁. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Layer-2 Overlay Network

A blockchain network 106 is already a form of overlay network overlaid on a network such as the Internet 101. However, it is also possible to layer another layer of overlay network on top of a blockchain. This is illustrated by way of example in FIG. 3. An example is the Metanet. Such a network could also be referred to as a "layer-2" network, in the sense that it is a second layer of overlay network relative to a base network 101 (e.g. Internet) as the underlying network infrastructure and the blockchain network 106 as the first layer of overlay network overlaid on the base network.

This second tier of overlay network 300 comprises a network of nodes 301 and edges 302. Note that a node 301 now refers to a node at the layer of the Metanet (or other such network overlaid on the blockchain), not a node 104 at the layer of the blockchain network 106 as discussed previously in relation to FIGS. 1 and 2. Each node 301 of the Metanet network (or the like) is a different respective transaction 152 on the blockchain 150, each of which stores data in a payload of the respective transaction. Hence a node 301 of the Metanet network 300 (or the like) may also be referred to herein as a data-storage node or data-storage transaction. The data stored therein may comprise data content and/or metadata, typically both. In an output-based model it may be stored in an unspendable output 203 of the respective transaction. The output may be made unspendable by means of one or more opcodes in the locking script that terminate the script when run. E.g. in a system that employs the Script language, this may be the OP_RETURN opcode, or OP_FALSE followed by OP_RETURN, depending on the protocol being used. However this is not limiting and the person skilled in the art will be aware of other techniques for storing any arbitrary payload data in a transaction in other blockchain systems, e.g. in a system employing an account-based model. The following may be exemplified in terms of an output-based model, but this is not limiting.

Note that the layer-2 overlay network 300 may consist purely of data, being entirely virtual. I.e. the nodes 301 and edges 302 of the Metanet or such like, as an overlay network overlaid on the transactions 152 of the blockchain 150, do not necessarily correspond to any particular physical actors or entities of the underlying blockchain network 106 or underlying network infrastructure 101.

The data content is the actual data the Metanet (or the like) is being used to store, e.g. text, audio, still or moving images, or other documents. It may also be referred to as user content or user data. The metadata implements the protocol for layering the network on top of the blockchain 150. In at least some of the transactions 152 it defines links between the data content. These may also be described as edges 302 between the nodes 301. The link or pointer may for example comprise the transaction ID, $TxID_{parent}$, of the parent node. Note that a "link" as referred to herein does not necessarily imply a hypertext link, though that is one possibility. More generally a link could refer to any form of pointer pointing to another node 301 to which the current node 301 is related at the Metatnet layer (or other such overlay layer layered on top of the blockchain 150).

For convenience the following will be described by way of example in terms of the Metanet, but it will be appreciated that this is not limiting and more generally, anywhere herein where reference is made to the Metanet, this may be replaced with any overlay network overlaid on a blockchain. Similarly any reference to a Metanet node may be replaced with reference to any overlay network node, or data-storage node of the overlay network, and any reference to a Metanet link or edge may be replaced with reference to any overlay network edge or link at the layer of the overlay network in question.

The Metanet protocol defines a scheme and standard for structuring on-chain data that can be stored on a public blockchain and used in various applications for many use cases. The protocol specifies that graph structures, comprising nodes and edges, can be constructed from sets of blockchain transactions, and that these structures may be used to store, convey, represent and distribute data ('content') of any nature. By treating transactions as nodes, and signatures as edges created between transactions, the Metanet protocol allows for the creation of on-chain graph structures as shown in FIG. 3.

As can be seen, the nodes 301 and edges 302 of the Metanet 300 form a tree structure. I.e. a parent node 301 is linked to one or more child nodes 301, and any given child 301 may itself be a parent linked to one or more children of its own, and so forth. Note that the tree structure in question for the present purposes may only be a subset of a wider tree or graph.

Figure 3:
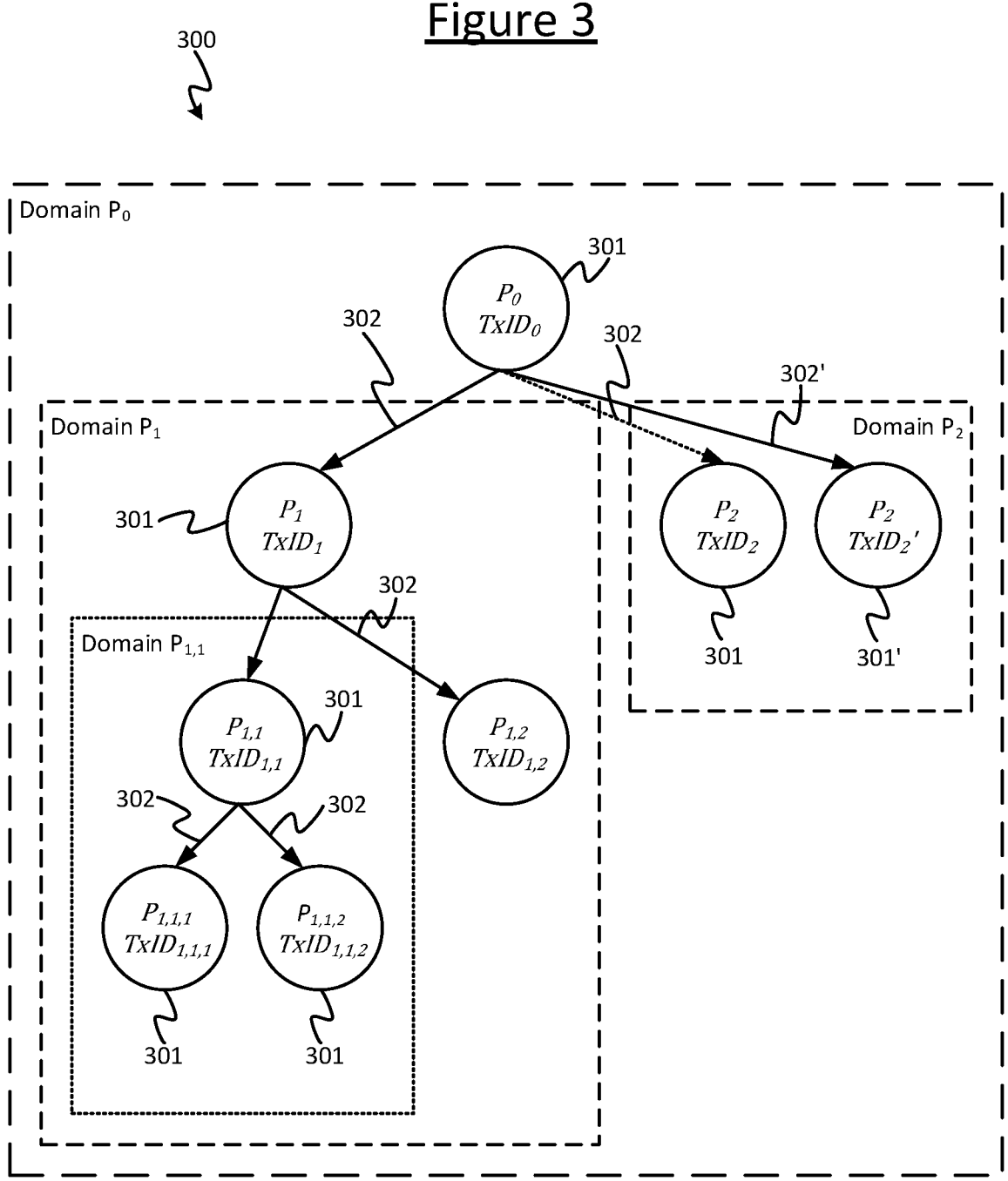
FIG. 3 is a schematic illustration of a network overlaid on a blockchain.

FIG. 3 also illustrates how a node 301 and its associated edge 302 may be updated. Since transactions are recorded immutably on the blockchain 152, an update to a Metanet node 301 requires creating a new instance 301' and corresponding edge 302' by means of a new transaction 152.

The structure of FIG. 3 may comprise nested domains, e.g. the structure of a website and its pages, where a 'top level domain' encapsulates the sub domains below it, and so on. One functional key domain (to be discussed later, e.g. the domain of the writing keys, funding keys or encryption keys) can span many of these structure domains.

The circles in FIG. 3 represent nodes, which are simply transactions that are created according to the rule set of Metanet protocol. An example of a transaction 152N that is created and formatted according that rule set is shown in FIG. 4.

Figure 4:
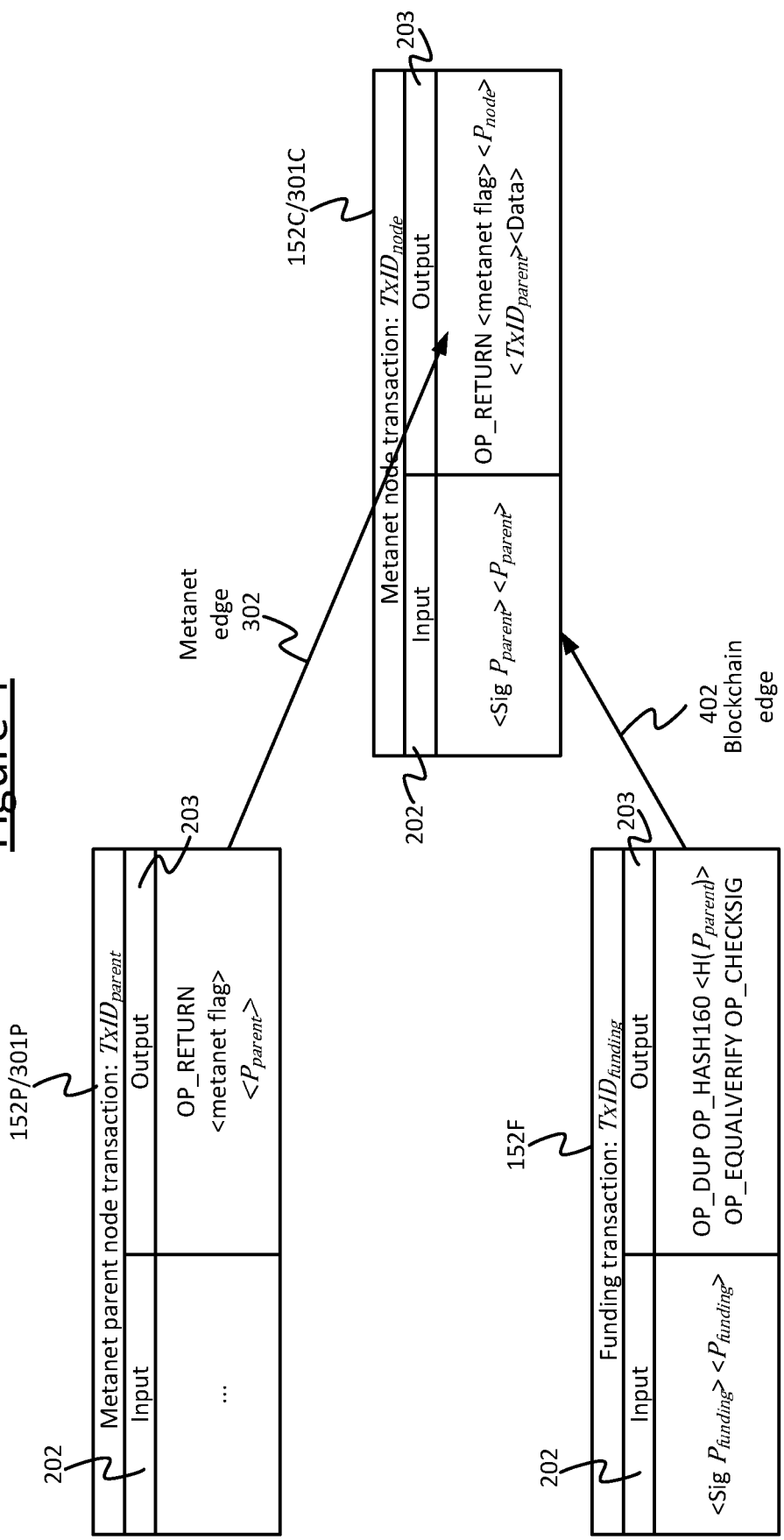
FIG. 4 is a schematic transaction diagram illustrating an example protocol for overlaying a network such as the Metanet on a blockchain.

The transaction 152C on the right-hand side of FIG. 4 represents a transaction 152 of the blockchain 150 implementing a given node 301C (a child) of the Metanet. The transaction 152P in the top-left of FIG. 4 represents a transaction of the blockchain 150 which implements a parent of the child node 152C at the Metanet layer. The child node transaction 152C has an input 202 which comprises an unlocking script, and which points to the output 203 of a funding transaction 152F of the blockchain 150. In other words the output of the funding transaction 152F is consumed by the input of the Metanet node 152C. Note that the funding transaction 152F and the Metanet parent transaction 152P are not necessarily the same transaction (though that is not excluded either).

The child transaction 152C includes an unspendable output 203, e.g. made unspendable by an OP_RETURN, which holds a payload (a payload from the perspective of the blockchain layer). This payload may comprise data content ("Data") of the Metanet, which be hashed and/or encrypted, or may be simply be the raw data ("in the clear").

The payload of the child transaction 152C also comprises metadata of the Metanet network layer. This metadata comprises at least the transaction identifier of the parent transaction 152P. This creates a link (edge) 302 at the Metanet layer. It may also be required by the Metanet protocol to include a key $P_{node}$ associated with the child node 301C.

The locking script of the output 203 of the funding transaction 152F also requires a signature to be included in the unlocking script in the input 202 of the child node 152C. Specifically, this signature is required to be a signature signed using a key $P_{parent}$ associated with the Metanet parent (i.e. a message signed by that key). This creates an edge 402 (sometimes called a spending edge) at the blockchain layer. If the required signature is not included in the unlocking script in the input 202 of the child transaction 152C, then the child transaction 152C will not be validated by the nodes 104 of the blockchain network 106, and hence will not be propagated through the blockchain network 106 nor recorded on the blockchain 150. Note again however that the funding transaction 152F is not necessarily the same blockchain transaction 152 as the Metanet parent transaction 152P, and hence the blockchain layer spending edge 402 is not necessarily the same as the Metanet layer edge 302.

FIG. 4 outlines only certain relevant components of a Metanet transaction as an abstraction of the transaction in its entirety. These components, in addition to a protocol identifier flag, include:

A public key $P_{node}$;
A signature SigP$_{Parent}$ of a parent public key $P_{Parent}$;
The transaction ID TxID$_{node}$ of the node itself; and
The transaction ID TxID$_{Parent}$ of the parent of the node.

The placeholder <Data> refers generally to any content data that may be included in the Metanet node transaction. It is also possible in some applications that one would want to encrypt the data with an encryption key ek, in which case the data included in the transaction is cast as <e(Data, ek)>, where e( ) is a suitable encryption function. Each Metanet node 301 can be uniquely identified by the pair ($P_{node}$, TxID$_{node}$), which is an index that allows for powerful versioning and permissioning control to be inherited by Metanet graphs. It should also be appreciated that each Metanet node contains enough information to identify itself ($P_{node}$, TxID$_{node}$) and its parent ($P_{parent}$, TxID$_{parent}$).

In order to ensure that a Metanet child node 301C transaction contains the correct input signature SigP$_{Parent}$ from a parent node 301P, it may be desirable in many cases to create one or more funding transactions 152F to facilitate this, which is shown in the bottom-left of FIG. 4.

The parent key $P_{parent}$ and/or child node key $P_{node}$ can be seen as a writing key that authorises writing the data of the child node 301C to the blockchain 150.

The Metanet thus provides a protocol that allows for on-chain data to be structured in such a way that encodes the permissioning and write-access controls for such data using only the underlying technology of the blockchain itself. The Metanet protocol is therefore a solution that allows users to provably own their on-chain content.

The Metanet protocol defines a set of rules that allows creation of a Metanet Direct Acyclic Graph (Metanet DAG). A single instance of a Metanet DAG is called a Metanet tree. Each Metanet tree has a root node (the top-level node), each Metanet node, including the root node, can have one or more child nodes (e.g. see again FIG. 3).

As such, the Metanet DAG becomes the global collection of trees, where each tree starts from its own root node and can have its own localised permissioning structure.

A Metanet node 301 is simply a transaction that follows the rule set of the Metanet protocol. There are two types of nodes: root nodes, which have no parent; and child nodes, wherein a given child node has exactly one parent. According to one implementation, the most basic outline structure of a Metanet node requires a transaction to meet the following criteria:

The transaction has at least one OP_RETURN output.
The OP_RETURN payload includes:
  the Metanet flag.
  a node address $P_{node}$.
  a parent transaction ID TxID$_{parent}$.
Each transaction, except the root nodes, contains an input signed by a parent node.

As mentioned, a Metanet node is a transaction 152 comprising four elements:
$P_{node}$—the address of the node.
TxID$_{node}$—the version of a node.
$P_{parent}$—the address of the parent of the node.
TxID$_{parent}$—the version of the parent of the node.

Metanet edges 302 are created by signatures. In order to create an edge from a parent node to a child node, the child node must be signed using the key pair associated with its parent, Sig $P_{parent}$ must appear in the input of the child node.

File Verification System

The following describes a method by which the Metanet—or other such graph structure overlaid on a blockchain—can be used to enable verification of files. For example this may provide protection against external tampering (such as by hackers, viruses or other malware) or against unintended behaviours by legitimate users (e.g. unintentional file deletion or modification). For instance the disclosed techniques may be used by a system administrator to place restrictions on files to prevent or permit certain actions by other users, such as reading, modifying, deleting or executing files.

Figure 5:
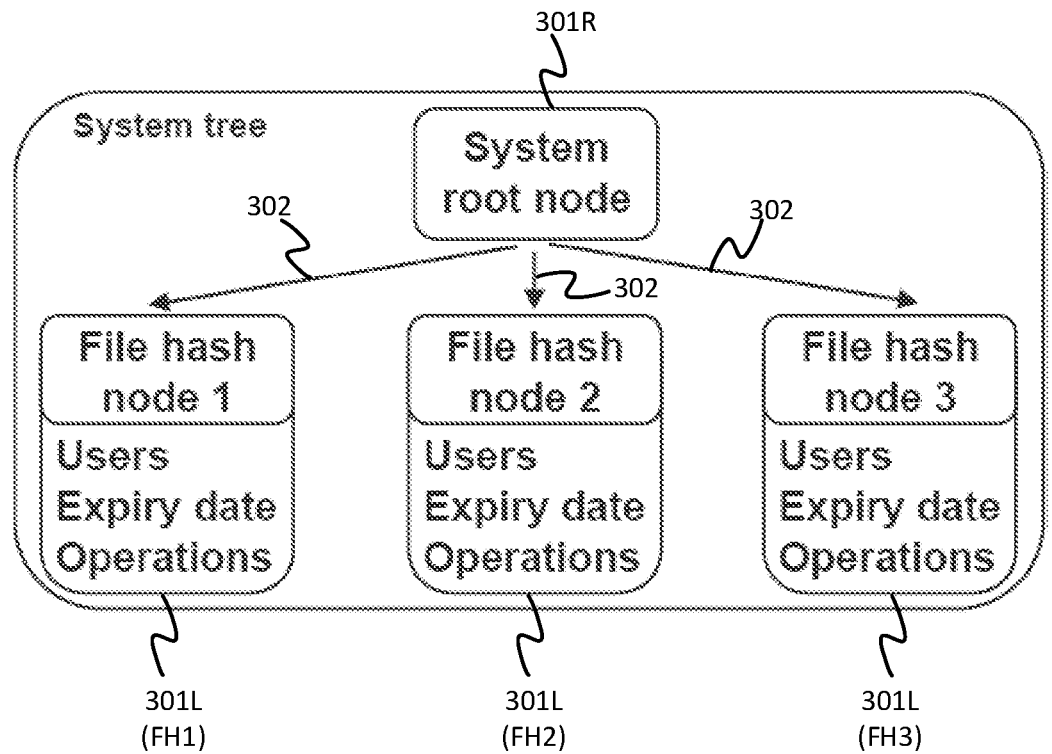
FIG. 5 schematically illustrates a Metanet system tree in accordance with embodiments disclosed herein, wherein the Metanet system tree represents a system root node and three file hash nodes.

Reference is made by way of example to FIG. 5. As shown, a tree structure is created comprising a root node 301R and a plurality of leaf nodes 301L. The tree structure may be created (and if required updated) for example by computer equipment of a system administrator as a central resource for use by the respective computer equipment 102 of multiple other users 103. Alternatively the tree structure could be created (and/or updated) by a given user's own operating system or file system for use as a private record for their own computer equipment 102.

Figure 9:
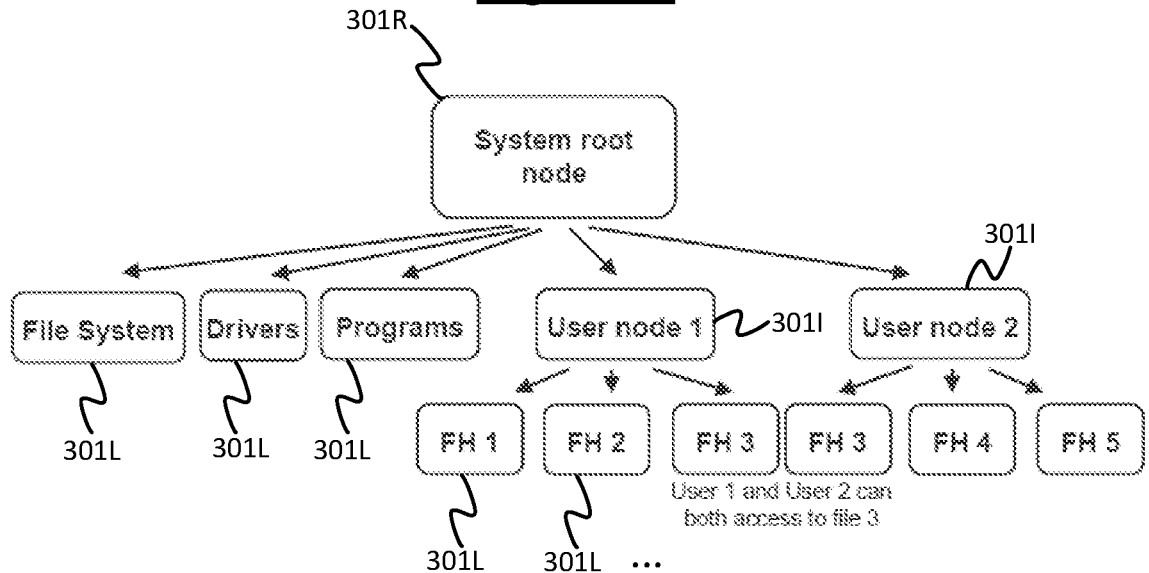
FIG. 9 schematically illustrates a multi-user system in accordance with embodiments herein, whereby protected files are managed by an administrator. Each user has access to a different subset of private files, and a file can be accessed by multiple users can (potentially with different permissions).
Figure 10:
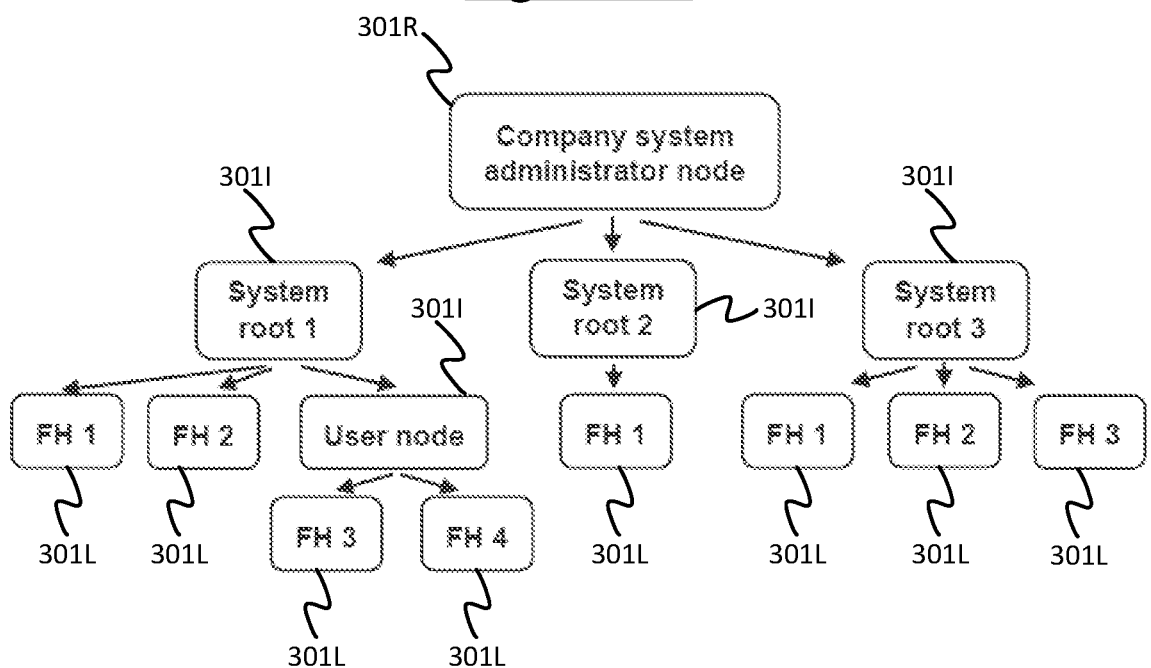
FIG. 10 schematically illustrates an enterprise scenario in accordance with embodiments disclosed herein, wherein the company system administrator initializes each system root. A User node can be assigned to a user to manage a subset of files or folders.

Each node other than the root 301R is connected by one edge 302 to a parent node, which could be the root node 301 or an intermediate parent node 301I which is itself a child of another parent (e.g. as shown in FIGS. 8 to 10). I.e. there could be two or more levels to the tree. Each leaf node 301L is a child node 301C. In the case of only two layers as shown in FIG. 5, the root node 301R is the parent node 301P of the leaf nodes 301L. In the case of more than one level to the tree (e.g. as in FIG. 8, 9 or 10), an intermediate level node 301I is the parent 301P of each leaf node 301L, and the parent of each intermediate level node 301I may itself be another, higher-level intermediate node 301I or the root node 301R, depending on the number of levels in the tree.

Each node 301 is a different transaction 152 of the blockchain 150, for example as discussed in relation to FIGS. 3 and 4. Each edge 302 is a link between a pair of nodes 301. An edge 302 is created by cryptographically signing the child node with a private key associated with the respective parent node, which can be authenticated using the corresponding public key of the parent. In embodiments these edges are created as discussed in relation to FIGS. 3 and 4. That is, each node 152 is a transaction of an output-based model (e.g. UTXO-based model) comprising at least one input 202 and at least one output 203, and the edge 302 is created by signing an input 202 of the child node 301C with the private key of the parent node 301P. To record the child 301C on chain, the input of the child 301C points to an output 203 of a funding transaction 152F whose locking script requires the signature of the parent to unlock and therefore to have the child node transaction 301C/152C validated by the blockchain network 106 for recordal on the blockchain. The parent node's key may be associated with the respective parent node 301P by being included in a payload in an output 203 of the parent node 301P. Also the transaction ID of the parent 301P may be included in a payload in an output of the child 301C. Refer again by way of example to FIG. 4. The payloads may be included in unspendable outputs of the respective transactions, e.g. made unspendable by an OP_RETURN or OP_FALSE and OP_RETURN, depending on the protocol being used. In embodiments the overlay protocol may be the Metanet protocol and thus the tree structure may take the form of a Metanet graph or part thereof.

However, in other overlay protocols it is not excluded that other methods could be used to create overlay edges 302 between transactions 152 and thus form a tree structure in which those transactions form nodes of the tree. Also, the tree structure could be formed using other types of transaction model, such as by means of smart contracts in an account-based model.

In accordance with the file-verification provisions disclosed herein, a record of at least one respective file is stored in the payload of each of one, more or all of the leaf nodes 301C. Each leaf node 301L may optionally also include metadata associated with its respective file. In embodiments, this metadata may comprise: an indication of a set of one or more permissions, an indication of one or more permitted users, and/or an indication of an expiry time (e.g. expiry date).

Note: in an output-based model, the "payload" of a given transaction for the present purposes may be included in one or more outputs (e.g. unspendable outputs) of the transaction 152 (i.e. node 301). This terminology does not limit to a single output. For example the parent transaction ID and the record of the file do not necessarily have to be included in the same output 203 of a given leaf node 301L (though that is one possibility); or the metadata and file record do not necessarily have to be included in the same output 203 (though again that is certainly one possible implementation).

The client software 105 run on the computer equipment 102 of at least one user 103—e.g. Alice or Bob—is configured to use the record of a file in one of the leaf nodes 301L to verify whether some current (purported) instance of the file held locally on the user's equipment is a true copy of the file. More generally the method disclosed herein could be run by any party on any computer equipment—not necessarily just by an end-user or consumer—but for the purpose of illustration it may be described as such in relation to embodiments herein. In embodiments the verification may be enforced by a low-level trusted piece of system software such as the operating system or file system on the user's computer equipment 102. In this case the client software 105 represented in FIG. 1 may comprise an operating system or file system with integrated blockchain-accessing functionality.

The record of the file included in a given leaf node 301L my comprise an explicit copy of the file, i.e. a raw (untransformed) copy of the file ("in the clear"). Alternatively it may comprise a transformation of the file, such an encrypted version of the file. As another alternative the transformation used as the record may comprise a hash of a preimage comprising the file, wherein the preimage could comprise just the file or the file concatenated with another element. Note therefore that the "record" of the file does not necessarily imply that the file can be recovered from the record. For the present purposes the record is any indication that allows it to be checked later whether some current (purported) instance of the file—the instance being verified, such as a local copy on the user's computer equipment 102—is the same as the instance of the file that was used to create the record. E.g. in the case of a hash, one can hash the current instance and compare the hash with the hash of the file on record in the leaf node 301L.

The tree structure or individual file record in a given leaf node 301L may be initially created, and/or later updated, for example by a system administrator, or by the operating system or file system of the user.

When the client software 105 is run, or when it comes back online after a period being disconnected from the blockchain network 106, it automatically inspects the blockchain 150 to download the most up-to-date version of the tree structure. It is configured to use the downloaded structure, or at least one of the leaf nodes, to verify whether a given instance of a file (the "current instance"), such as an instance held locally on the computer equipment 102, is legitimate. For example it may do this periodically, or in response to a certain event such as a request by the user 103 to perform a certain action on the file (e.g. read, write or execute), or a virus scan, or such like.

To perform the verification, the software 105 performs at least two constituent checks, and requires both to be positive for the current instance of the file to be verified.

The first check is A) that the tree structure meets the requirements of the overlay protocol (e.g. Metanet protocol) for a valid graph. This comprises at least checking that each child node 301C is signed with a key of its respective parent node 301P (i.e. includes a signature generated from the key associated with the respective parent). So in the two-level case shown in FIG. 5, each leaf node 301L must be signed by the key of the root node 301R. Or in a tree with more than two levels, such as in FIGS. 8-10, each leaf node 301L is signed by the key of its respective intermediate parent 301I, and each intermediate parent (itself being a child 301C of another parent 301P higher up the tree) is signed by the key of either the root node 301R or another intermediate parent 301I, depending on its position in the hierarchy.

In an output-based (e.g. UTXO based) transaction model, the requirement for the signature may be that an input 202 of the child transaction 301C/152C is signed by the key of the respective parent 301P, and that the key of the respective parent 301P is included in a payload in an output 203 of the parent 301P/152P (e.g. in an unspendable output, such as made unspendable by an OP_RETURN or OP_FALSE and OP_RETURN, depending on the transaction protocol and script being used). The parent key itself (as well as the signature) may also be required to be included in the input of the child 301C/152C.

In embodiments the first check A) may also comprise checking that one or more further requirements of the overlay protocol are met, e.g. that the payload of the child 301C/152C includes the transaction ID of the respective parent 301P/152P.

The second check is B) a check that the current instance of the file—i.e. the purported instance of the file currently in question—matches the record of the file kept in the relevant leaf node 301L. If the record comprises an explicit copy of the file itself (the raw file "in the clear"), then this check comprises comparing the files to check they are identical. Or if the record comprises a hash of the file, then the check comprises hashing the current (e.g. local) instance and comparing the hashes to check they are identical. Or if the record comprises an encrypted version of the file, the check may comprise encrypting the current (e.g. local) instance using the same encryption and checking that the encrypted versions are identical; or decrypting the recorded instance and checking that this matches the current (e.g. local) instance. In some cases both encryption and hashing could be used.

Note that the two checks could be performed in either order: A) & B) and "first" & "second" are just arbitrary labels.

Only if both checks A) and B) are found to be true, the file in question may be declared as verified, i.e. valid (though the term "valid" in this context, of verifying a file, is not to be confused with the validation of a transaction by the node protocol applied by nodes 104 of the blockchain network 106—both are required but they are different concepts). For example this may comprise the operating system or file system on the user's computer equipment 102 declaring that the file is verified and therefore safe to use. E.g. in embodiments the user may be requesting to perform some action on the file, such as to read or execute it, and the operating system or file system will only allow this action to go ahead on condition of the disclosed verification being passed.

In embodiments, the operating system or file system is configured to read the permitted actions from the same node 301L in which the record of the respective file is held. In this case the operating system or file system will only allow a requested action (e.g. read, write, delete or execute) to be performed on the file if, as an additional condition, the requested action is amongst the permitted actions specified in the respective node. Alternatively or additionally, in embodiments the operating system or file system is configured to read the permitted users from the node 301L in which the record of the respective file is held. In this case the operating system or file system will only allow a requested action (e.g. read, write, delete or execute) to be performed on the file if the user requesting to perform that action is amongst the permitted users.

In embodiments, one or more additional checks could also be applied (e.g. enforced by the operating system or file system) as a further condition for verifying the file. These may comprise for example: a third check C) that the root node must be signed by a specific trusted entity, e.g. a system administrator; a fourth check D) that the child node 301C in which the record if the file is recorded must not itself be a parent 301I of another child node 301C in the tree (i.e. it must be a leaf node 301L); and/or a fifth check E) that the expiry time included in the record must not be earlier than the current time (i.e. the record has not expired). Check C) provides an additional level of trust in the process. Check D) allows a mechanism for invalidating or updating old records by appending a new leaf node to the old node, as will be discussed in more detail. Check E) prevents records being used to verify files indefinitely if, for example, the user's computer 102 goes offline and cannot access the most up-to-date version of the tree from the blockchain 150 for some time.

Note that all these checks could be performed in any order: A-E) and "first" to "fifth" are just arbitrary labels.

Figure 6:
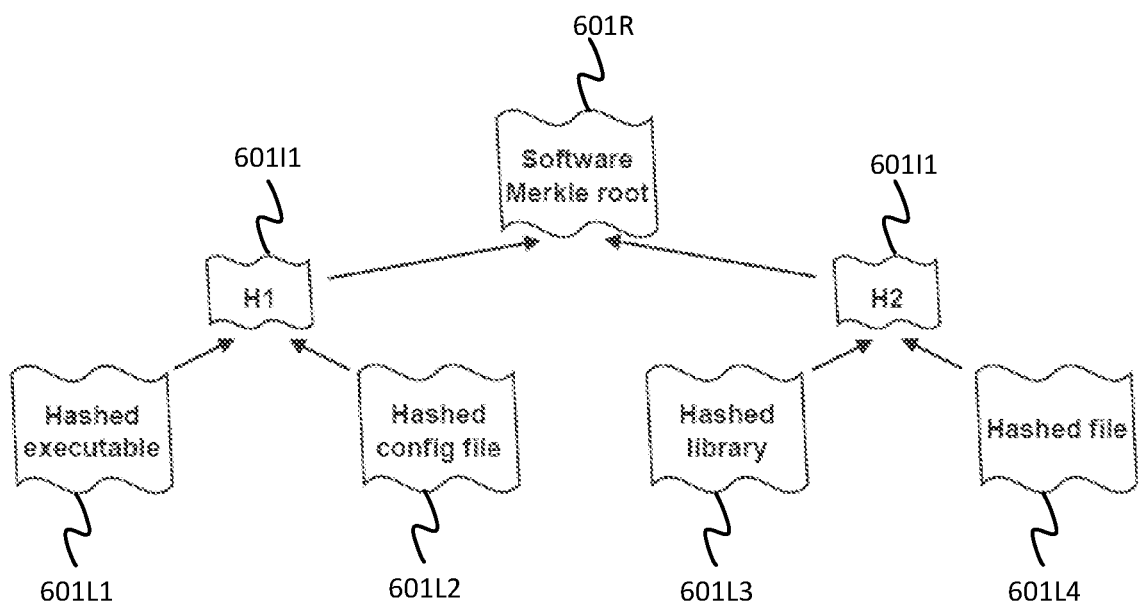
FIG. 6 schematically illustrates use of a Merkle tree in accordance with embodiments herein, whereby all the files required to run a program are linked in a Merkle tree, and the Merkle tree root is stored in a file hash node.

FIG. 6 illustrates another example variant which may be employed in embodiments of the presently disclosed techniques. FIG. 6 shows a hash tree, sometimes also referred to as a Merkle tree. Note that the nodes 601 of the hash tree do not correspond to the nodes 301 of the tree structure of the overlay network in FIG. 5 and the like. The hash tree comprises a plurality of hash leaves 601L, each being a child in the tree to one parent. At the root of the tree is a hash root 601R.

To determine the hash tree, the leaves 601L are arranged into one or more leaf-level sets, and within each set the leaves of that set are combined with one another (e.g. concatenated) and then the combination hashed. If there is only one leaf-level set (i.e. if the leaf-level set is all the leaves), then the hash of this set is simply the hash root 601R. If on the other hand there is more than one set of leaves (i.e. the leaves are divided into different leaf-level sets, as shown), then the resulting hashes are arranged into one or more second-level sets. Within each second-level set, the hashes from the level below are combined with one another (e.g. concatenated) and then this combination is hashed. If there is only one second-level set, then the resulting hash from this becomes the hash root 601. If there is more than one second-level set, then the same process is repeated at a third level, and so forth, up the tree until a hash root is determined. A hash tree is sometimes also referred to as a Merkle tree (in which case the hash root may be referred to as the Merkle root and the hash leaves are referred to has Merkle leaves). Although "Merkle tree" is sometimes taken to imply that each set is exactly two members in size (i.e. hashes are done in pairs all the way up the tree), and this limitation is not necessarily imposed herein.

According to some embodiments disclosed herein, each leaf 601L in the hash tree is the hash of a preimage comprising a different respective file from a group of related files, e.g. the files of a particular piece of software (such as the executable file and related data files). The hash root 601R is then computed from this group of files. In such embodiments, the file record stored in a given one of the nodes 301 in the overlay network tree (e.g. Metanet tree) may be the hash root 601R of the plurality of files (so the whole tree shown in FIG. 6 represents a way of calculating the record to be stored in a single one of the nodes 301 of the tree shown in FIG. 5 or the like). The check B) will then comprise checking that the corresponding hash root computed from the current, local copies of the files on the user's computer equipment 102 is identical to the hash root 601R stored in the corresponding the overlay network node 301 on the blockchain 105. This way, if an instance of even a single one of the files in the group is altered on the user's computer equipment 102, then the whole group of files is invalidated for the user. E.g. again this test may be enforced by the operating system or file system.

In such embodiments, at least some of the nodes 301 in the overlay network tree structure of FIG. 5 or 7-10, for example, may each record a different respective group of files (rather than an individual file per node 301).

FIG. 7 shows an example mechanism for updating file records in the tree. As one possibility, a new leaf node 301L' can be appended to the same parent node 301P/R/I as the leaf node 301L containing the previous record. I.e. a new edge 302' is created from the same parent node 301P/I/R as the old record's parent to the new node 301L'. In this case both leaf records 301L, 301L' remain valid. In another possibility however, the new leaf node 301L' is appended to the node 301 (previously a leaf 301L) that contains the old record. I.e. a new edge 302' is created from the old record's node 301 to the new node 301L'. In this case, combined with check D) mentioned above, then the old record will be invalidated, leaving the new record as the only valid version.

FIGS. 8 to 10 show some examples of tree structures with more than two levels. In FIG. 8 the tree structure is used to mimic a file folder structure. In FIG. 9 the root node is associated with a key of a system administrator whilst intermediate parents 301I may be associated with keys of individual users. E.g. the users' keys may be allocated to the users by the system administrator to given them permission over a certain subset of the tree. FIG. 10 shows an example where the root node 301R is associated with an overall company system whilst different intermediate parents 301I are associated with different subsystems within the company.

Note: while embodiments above have been described in terms of managing files (read, execute, etc) where the verification mechanism is incorporated as part of the operating system or file system, this is not limiting. There are other possible use-cases where a user might only want to check the integrity of the files, and in this case a simple application or other piece of software (e.g. a kind of anti-virus) could also implement the method. This software will be configured to verify the integrity of other files, and the software will alert the user in case of unwanted file changes or hackers that compromised files or programs. The process is the same as described above but doesn't have to be integrated in the operating system or file system. Rather it can be a program that the user just installs and that allows the user to initialize a new tree and check file integrity later (and alert in case of file changes).

FIG. 11 shows an example transaction for implementing a child node 301C in a UTXO-based transaction model.

Figure 12:
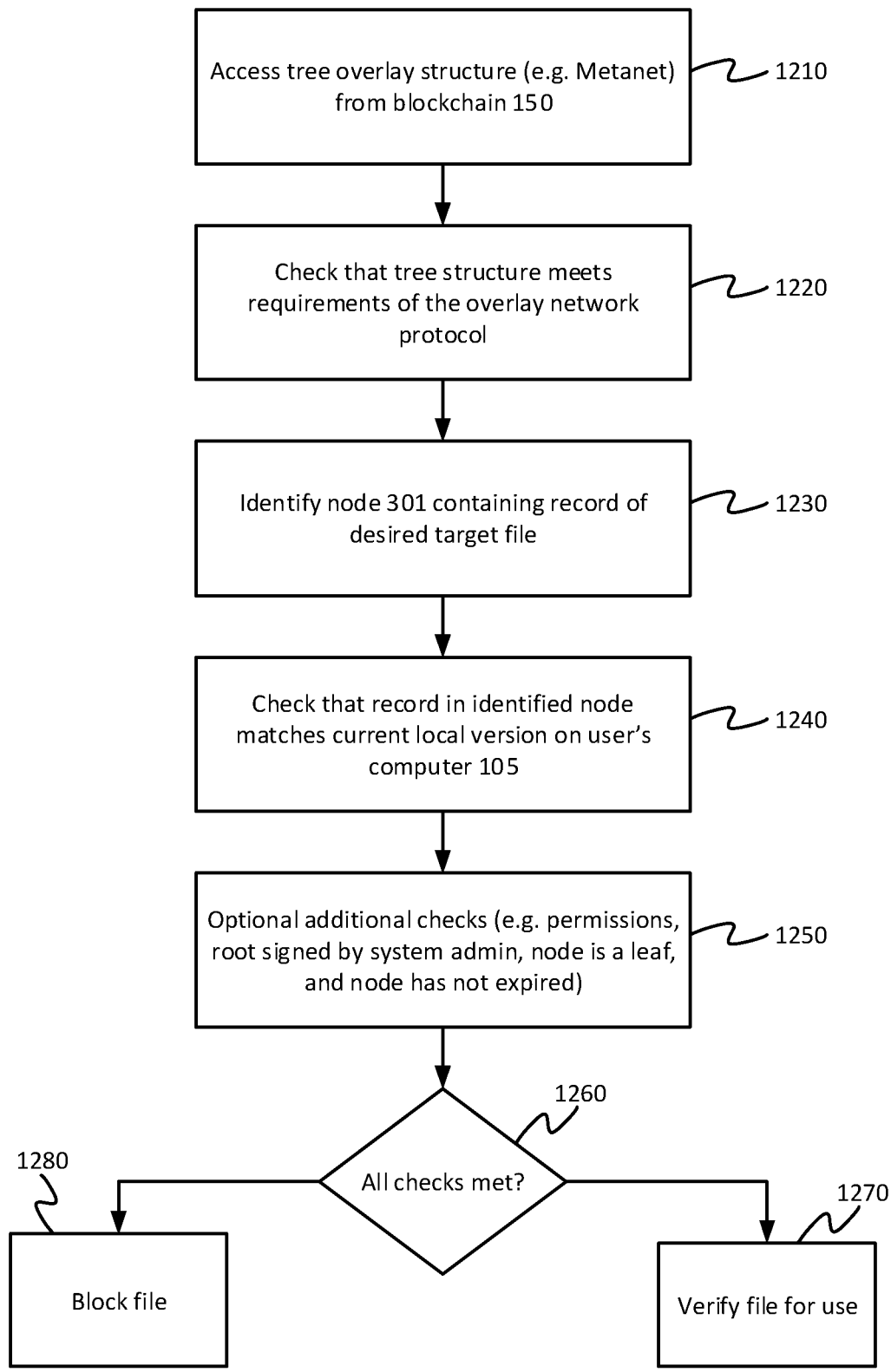
FIG. 12 is a schematic flow chart showing an example method in accordance with embodiments disclosed herein.

FIG. 12 is a flow chart of an example method in accordance with embodiments disclosed herein. E.g. the method may be performed automatically by an operating system or file system. At step 1210 the method comprises inspecting the blockchain 150 via the blockchain network 106 in order to access the overlay network tree structure (e.g. Metanet graph). This step could be performed by the operating system or file system periodically, and/or in response to a certain event such as when the user requests to access a certain file and/or when the computer equipment 102 comes back online after a period of being unable to access the blockchain network 106 (e.g. because it was not connected to the internet). If this is not the first time the operating system or file system has accessed the tree structure, it may update a previously downloaded version of the tree stored locally on the computer equipment 102. The downloaded version maybe used to verify files later if the computer equipment 102 goes offline again. Hence in some scenarios step 1210 may be replaced by accessing the locally downloaded copy of the tree from local storage of the user's computer equipment 102.

At step 1220, the method comprises checking that the accessed tree structure meets the requirements of the overlay network protocol (e.g. Metanet protocol). At step 1230, the method comprises identifying which node 301 of the tree structure contains the record for some desired target file to be verified, e.g. a file the user is requesting to access to perform some action on (e.g. read, write, delete or execute). Note that steps 1220 and 1230 could be performed in either order relative to one another.

At step 1240 the method comprises checking that the record of the file in the identified node 301 matches the current instance in question, e.g. the local version on the user's computer equipment 102. E.g. this may comprise comparing the file hash in the record with a hash of the current instance.

At step 1250 the method comprises performing any additional, optional checks that may be imposed, depending on implementation. This could comprise checking that the user has permission to access the file, and/or that the action the user is requesting is permitted. As further alternative or additional examples, this step could comprise any one, some or all of the checks C)-E) mentioned earlier.

Note that the checks 1220, 1240 and 1250 could be performed in any order relative to one another.

At step 1260 the method determines whether all of the applied checks have been met. Only on condition of all these checks being met, the method proceeds to step 1270 where it verifies the current instance of the file for use. E.g. this may comprise allowing a requested action to be performed on it (e.g. read, write, delete or execute). However if any of the checks is not met, the method branches instead to step 1280 where the file is declared as not verified. Preferably this comprises blocking the current (purported) instance of the file from further use.

By way of further illustration, the following will now describe some examples of the above concepts in more detail in the context of a Metanet based implementation.

Metanet Based System

According to embodiments disclosed herein, the Metanet can be used to guarantee system security, providing the methods to enable on-chain software validation and data integrity. A system administrator that wants to use a Metanet-secured system, can create a Metanet root node and uniquely associate it to its system (e.g., a terminal or a server). A new Metanet root per system may be provided. Each file can be hashed using a standard process (e.g., sha256) and the hash can be stored in a Metanet node child of the system Metanet root node (e.g. FIG. 5). This may be referred to herein as a file hash (FH) node. Each Metanet node may also specify the operations permitted on the file (read, write, execute) and the users allowed to execute them.

File Validity

A file is considered valid if the file hash node associated to it met three conditions (as well as the tree itself having been verified as meeting the Metanet protocol):
 I. the hash of the file is the one indicated in the file hash node,
 II. the file hash node is a leaf node (it has no children), and
 III. the file hash node is not expired.

A file hash node expires when the expiration date written in the transaction representing the node has passed or when the UTXOs included in that transaction are spent. A file hash node with expiration date is valid until the set expiration, unless the UTXOs are spent before that that date. A file hash without expiration date is valid until the its UTXOs are not spent.

The second condition (ii) is to enable invalidation or update of nodes. Though in embodiments, note that there are at least two possible mechanisms for invalidation: one is to assign (e.g. spend) the output 203 of a Metanet node at the transaction level, or the other is to create another leaf node attached to that node by a Metanet edge 302 at the Metanet level.

To set a file as invalid two methods are possible:
 i. append a new node to the current file hash node. This node can contain an empty field instead of the hash or a random hash (e.g. for privacy reasons); or
 ii. generate a new transaction (not necessarily a Metanet transaction) that spends the UTXOs included in the file hash transaction.

As already mentioned, the file validity can be configured setting an expiry date: in this case the file is valid until the time set (in human time or block height) is reached. After that, the file must be renewed by the system administrator by appending to the expired node a new file hash node with the same hash but a different expiry. As an additional security measure, an operating system can automatically delete files associated with expired file hash nodes. Preferably the operating system will maintain an updated version of the tree locally so that it can check file hash node validity. In case of validity checks using also the UTXOs, an updated copy of the pending transaction pool 154 should also be available.

Software validity: a piece of software is considered valid if the file hash node (in case of a software with a single file) or the Merkle root node storing the Merkle root 601R (in case of software with multiple files or dependencies) respect the same conditions of general files. In addition, Merkle root nodes build and verify the Merkle tree validity.

File update: when a protected file has to be updated, a new file hash node is generated by the system administrator (the process for software using Merkle tree nodes is the same). Two possible cases can be identified (see FIG. 7): the first is that old version of the file is still valid, whilst the second possibility is that the old version of the file becomes invalid (no operations on that file are permitted anymore).

First possibility: only the updated version of a file is valid. If only the latest version of a file should be valid, the new file hash node must be appended to the older version of the node. Only the newest node (i.e. the deepest in the tree) of a branch is valid, and therefore the intermediary versions are considered invalid and any operation attempted based on them is disabled. To enforce a higher level of security, the operating system could automatically delete files associated with file hash nodes that become invalid.

Second possibility: older versions of a file remain valid. If more than one version of a file should be valid, the new file hash node has to be appended to the system root node instead of the old file hash node (the two nodes are siblings).

Replicating Folder Structure

Until now in this part of the description, the file or file hash (or software or MerkleTree) node binding have been purely logical: if there is a valid file hash node in a SysMet tree, then the file that has the same hash inherits the file hash node properties and limitations. In this section however, a further level of security is introduced, binding also the system folder structure to the Metanet tree structure. E.g. see FIG. 8. This guarantees a higher level of security: not only does a file have to be valid (valid file hash node), but it has to be in a specific folder in order to be used.

In this implementation, the Metanet tree reflects the system folder structure describing the file position in the tree structure. When this technique is used, the file hash nodes are created following the folder structure, with folders and sub-folders. This technique requires the use of a new type of Metanet nodes: the folder nodes.

Folder node: a Folder node is a Metanet node used to mimic the folder structure in a system. This type of node may also contain the hashed absolute folder path and name (e.g. sha256("C://folder/path/folder_name")) and can be linked to file hash nodes (the files contained in that folder) and other Folder nodes (its subfolders).

In their simplest form, folder nodes are used as placeholders to replicate the system folder structure. However, these nodes can be enriched containing also information about the folder and its content in form of metadata. In some embodiments control fields, such as user IDs list and permitted operations list, may not be able to be assigned to folder nodes, and therefore the file permissions may instead be managed using file hash or Merkle root nodes. More advanced permissioning structures can be achieved using User nodes (described later).

In this implementation, file validity is checked as follows:
 I. Check if a file has a valid file hash node (as described earlier), and
 II. Check that the hashed file absolute path matches the one stored in the file hash parent node (the folder node).

Multi-User System

Several users can be given access to the same system or part of a system and be authorized to perform operations on specific files or specific folders. In the simpler cases, like giving permission to read a file, all the user IDs can be listed in a file hash or Merkle root node. However, more sophisticated cases may require special management and a more structured permissioning methodology. In these cases, a system administrator can create user-specific Metanet nodes to transfer them node ownership. These user-specific nodes are hereafter called user nodes and they are associated to a specific user. This type of files is used to transfer file or folder management to the users (similar to Unix command shown).

User Node: a user node, as disclosed herein, is a Metanet node that can be used to authorize a user to perform some operations on a system without requesting each time an explicit authorization to the system administrator. A user node is created by the system administrator and appended to the system root node 301R (see FIG. 9) or a folder node. In embodiments the system administrator can enforce some limitations on the user nodes, and the subsequent nodes, created from user nodes (their children), will inherit the same limitations. These limitations may include the type of operations permitted, the expiry date, the allowed file types and the file location.

A user can now add new files and programs to its system, provided that he/she respects the limitations specified in the user node. For example, a user node could be allowed to read and write files but not to execute them, or files can be executed only in predefined drives or folders. These limitations help preserve the system security. For example, if an attacker steals a user private key without those limitations, she/he could otherwise take full system control compromising the entire machine.

The idea of user nodes as illustrated in FIG. 9 is distinct from the idea of simple user permissions as shown for example in FIG. 5. In FIG. 5 the system administrator just specifies that a user has a specific permission for this node, whereas with a system of user nodes as shown in FIG. 8, the system administrator can allow the user to create new sub nodes of his/her own. For example the user may be allowed to own a certain folder, and add new files or subfolders folders and or delete them again.

In embodiments, when a user node is updated, all its children nodes are invalidated by default and they need to be recreated and appended to the new version of the user node. Although this might look inefficient, it guarantees that the nodes created from a user node always reflect the same properties (e.g., permissions, expiration date) of the parent user node.

A user node may be created as follows: a Metanet node owned by $P_{parent}$, where $P_{parent}$ belongs to a system administrator, creates a new Metanet transaction specifying as new owner $P_{node}$, where $P_{node}$ belongs to a user U. From this point, U can create new Metanet tripwire nodes and append them to its branch.

Multiple Systems Administration for Enterprises

Enterprises may prefer a stricter system management, where only a company system administrator can validate files and programs on all the machines. This system administration can be achieved by adding a new layer to the proposed architecture. In this case the system root node of each system is created by the company system administrator using a Company System Administrator node (see FIG. 10).

In this scenario, the company system administrator is the only one allowed to update or invalidate a file in any company system. A specific system or part of it can be assigned to a user by creating a user node associated with a public key owned by that user. Alternatively, a user can add a file to a system and request the company system administrator for approval. The system administrator verifies and validates the file and adds a new file hash or Merkle tree node to the system tree. As soon as the new node is added, the system can validate the file and execute the required operations.

File Storage On-Chain

File hash nodes can be modified to store the entire file on-chain instead of only its hash. These nodes are hereafter called file nodes. File hashes guarantee validation and integrity, but full file nodes can be useful when also safe storage is required or when updating files using other techniques is complicated or unfeasible.

This is useful because as system administrator can just release a file once by releasing it on chain, and then all the users' computers 102 can download the data. The release may be automatically detected and updated by the operating system when the user's computer 102 goes online (the administrator doesn't need to send a message such as an email round alerting users to the update). E.g. this enables the blockchain to be used as a way to update drivers, libraries, etc. without the need of an external server. The user's operating system knows where to look on chain because it has the previous version of the file associated to the known Metanet tree. So when it downloads the latest version if the tree to check if updated, it will see latest version of file as a new leaf.

Safe Storage: important data can be stored and retrieved using a file node, so in case of hardware damages or thefts the files can be always retrieved. As the blockchain is publicly available, data uploaded on-chain may be encrypted with state-of-the-art encryption techniques and the keys stored safely. Sensible and confidential files should preferably not be stored on-chain, at least not in unencrypted form.

File update: a system administrator managing several systems can release file updates directly on-chain. Each time a system retrieves the latest Metanet system tree, it will also automatically update those files. This can be useful, for example, to release security fixes or to update configuration files. If only the system administrator can configure and update the system preferences, he/she can do that by releasing config files on-chain in a file node. Each system automatically updates its copy of the system tree, invalidating the old config file and downloading the latest version found in the valid file node (the node without children and not expired).

Metanet Tripwire Protocol

In this section, by way of a particular example protocol, the Metanet Tripwire Protocol (MTP) is introduced. It is then explained how to use it to create Metanet-secured systems. The MTP is built over the Metanet protocol, specializing the Metanet nodes and adding a set of rules to secure the operating systems. The Metanet tree structure is used to control and validate files and folders in any generic system (e.g. laptop, server, smartphone).

An operating system that integrates the MTP checks its Metanet system tree before any file operation (i.e., read, write, execute) and executes that operation only if the file is valid. As already discussed in the previous sections, a file is valid if the file itself or its hash is stored in a valid Metanet Tripwire node (a node is valid if it respects the properties discussed previously). Since a copy of the file or its hash are always stored on the blockchain, a single change in a file would be detected by the MTP and would trigger an event flag that denies the operation from happening.

Sophisticated tripwire mechanisms are possible, like in the case of software requiring multiple files to be executed (e.g., executable, configuration files, libraries, data). In these cases, each file hash is used to create a Merkle tree that is stored in a Merkle root node. The Merkle tree acts as a 'tripwire' and a single change in any of these files sets it off, triggering an event flag that prevents the software from being executed. This is particularly useful not only to prevent malware attacks, but also, for example, when license agreements are in place or when a user wants to prove that a certain result are obtained using a specific set of software and libraries.

Metanet Tripwire Nodes and Edges

The Metanet nodes are used to store the hash of the files or the files themselves. They are also used to grant permissions to users and to store files and folder information. These nodes are linked using Metanet edges, forming a hierarchical control structure. The process to create a new Metanet Tripwire node and a new Metanet Tripwire edge is here described:

Metanet Tripwire Node: Metanet Tripwire (MT) nodes are Metanet nodes specialized to validate or store files and manage permissions, users and folders. A Metanet node is a blockchain transaction that follows the Metanet protocol. A Metanet node is created by including in a transaction an OP_RETURN followed by a Metanet flag (4-bytes prefix). After the Metanet flag, the transaction contains the information regarding the validity of the file, like its hash and any other optional parameter, such as the expiry date or the list of permitted operations. Each node is assigned a new public key $P_{node}$ controlled by the system administrator, the private key associated to $P_{node}$ is required to create a child of that node. Therefore, only the owner of the private key can update or add new files. Creating a User node means create a new MT node where the public key $P_{node}$ is controlled by the system user, allowing him/her to create new files or folders. The different types of MT nodes are described above.

Metanet Tripwire Edge: a Metanet Tripwire edge follows the rules of standard Metanet edges: a Metanet Edge is an association between two Metanet nodes, a parent Metanet node and a child Metanet node (in the MTP these are MT nodes). The edge is created when the parent signature appears in the input of another Metanet node (the child). Only a parent can create an edge and, therefore, link itself to a child. Edges are used to create a link between the different nodes. For example, there is always a link between the system root node and its file hash and user nodes, and between a file hash node and a newer version of the same file. An example of a Metanet Tripwire transaction is shown in FIG. 11.

Node Types

In this section the MT nodes are listed and described in detail. All the MT nodes are Metanet nodes with additional fields included in the OP_RETURN (e.g. FIG. 11).

System root node: the system root node does not contain a parent public key. However, to prevent spoofing attacks, it is created by a system administrator. The <file hash> field stores a system hash or a unique identifier that describes the system (e.g. a combination of MAC address, drives serial numbers, CPU information, etc). The parent of a system root node is a system administrator or the system owner.

User Node: a user node is used to transfer node ownership from the system administrator to a user or from a user to another user. The new user is specified in the <user> filed and the list of permitted operations in the <permitted operations list> field. The parent of a user node can be a system root node, another user node, or a folder node.

File hash node: a file hash node contains the hash of a file. The hash is stored in the <file hash> field. Additionally, the path can be specified in the <path hash> field. The parent of a file has node can be a system root node, a folder node or a user node, or another file hash node in the case of an update.

Merkle root node: groups of files that need to be linked together (e.g., for a software: an executable, a config file, some libraries and data could be required) can be hashed together in a Merkle tree and the Merkle root is stored in a Merkle root node (like a file has node but storing the Merkle root for a group of files rather than just the hash of an individual file). The Merkle root is stored in the <file hash> field. The ordered list of files (including the absolute path) contained in the Merkle tree is stored in the <file list> field. The parent of a Merkle root node can be a system root node, a folder node or a user node, or a file hash node or another Merkle root node in the case of an update.

File node: a file node stores an entire file on-chain. The <file> field contains the bytecode of the file and, optionally, the <file hash> field stores the hash of the file (like a FileHash node). The parent of a file node can be: a system root node, a folder node or a user node, or another file node in case of update.

Folder node: a folder node is used to describe a system folder structure. The <path hash> field stores the hash of the absolute path. This type of nodes is used when the system folder structure is to be replicated in the System tree. The parent of a folder node can be a System root node, another folder node or a user node.

Tree Implementation

The MT protocol is composed of two main phases: tree initialization and node management. The following describes these phases and discusses the step-by-step process involved in completing and executing them.

Tree Initialization: In the tree initialization phase, the Metanet system tree is created and the system root is initialized. The following steps are performed:
 1. The system admin is chosen.
 2. The system admin chooses a root key $P_{admin}$.
 3. $P_{admin}$ is used to create the system root node and including:
    I. the system unique identifier, and
    II. a new key $P_{root}$ (the relative private key is controlled by the system admin) that will be used to create the initial nodes.
 4. The system admin initializes the system using the transaction ID of the system root node and the key $P_{admin}$ (alternatively $P_{root}$ could be used).

Node Management: the node management phase involves three main operations: MT node insertion, update and deletion.

Insertion: new MT nodes can be appended to the system root or to other nodes following the rules described above. A new node is created as follows:
 1. A new transaction is created, inserting the required fields (e.g., metanet flag, users id list, expiry date, . . . ) after the OP_RETURN.
 2. The parent node adds a new key $P_{node}$, the transaction ID of the parent node and signs the transaction. The private key relative to $P_{node}$ is controlled by the system administrator except when the new node is a user node. In this case the private key is controlled by the user and future children of this node will be signed by the user.

Update: nodes are updated by creating a newer version of an existing node (e.g. updating the hash). If the node is appended to an older version (it is a child of the older version), then only the new version is valid (usually the same key $P_{node}$ of the parent is used in this case). If the new version is appended to the same parent of the older node (they are siblings), both versions are valid (usually a new key $P_{node}$ is used in this case).

Deletion: nodes are deleted by appending a new node with an invalid hash or by spending its UTXOs (see the x BSV in FIG. 11). Only the system administrator or the user that knows the private key associated to $P_{node}$ can append a newer version of a node or spend the UTXOs.

Tree Management on the Operating System

The operating system is initialized by a system administrator that sets up the tree by storing (in a secure way) the key $P_{root}$ and the transaction ID of the root node. When the system is initialized, it downloads the latest version of the Metanet system tree from one or more mining nodes.

Each time an operation on a file needs to be performed, the file is checked against the system tree and the operation is completed only if the file is valid. When the system administrator or a user updates a file or a software, the latest version of the Metanet system tree must be downloaded. For increased security and speed, the system tree can be updated periodically and all the files can be checked preventively.

Example

1. A new system is initialized. It downloads the Metanet system tree.
2. A user tries to open a file.
3. The file is checked against the Metanet system tree:
   a. If the file is valid and the user has the permission to open the file:
      The file is opened.
   b. If the file not valid (e.g., an attacker inserted a malware) or the user has not the permission to open the file:
      The system sets off the tripwire triggering an event flag and the operation is denied.

It will be appreciated that the above embodiments have been described by way of example only.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

More generally still, there may be provided a method, apparatus or program in accordance with any one or more of the following Statements.

Statement 1: a method of using a tree structure overlaid on a blockchain, the tree structure comprising a plurality of nodes and edges between nodes, wherein each node is a different transaction recorded on the blockchain, and each edge connects from a respective child node to a respective parent node, the edges being formed by each transaction comprising a transaction ID and each child node specifying the transaction ID of the respective parent node in a respective payload of the child node, and wherein one of the parent nodes is a root node of the tree structure; the method comprising: inspecting the blockchain to identify at least part of the tree structure, including at least identifying a target one of the child nodes which includes a record of a file in the respective payload of the target child node, and identifying a path comprising one or more edges back through the tree structure from the target child node to the root node; performing checks comprising: A) for each edge along the identified path from the target child node back to the root node, checking that the respective child node is signed by a key associated with the respective parent node, and B) checking that a current instance of the file matches the record included in the target child node; and verifying the current instance of the file at least on condition that checks A) and B) are positive.

Statement 2: the method of Statement 1, comprising enabling a user to perform a requested action on the current instance of the file on condition of said verifying.

Statement 3: the method of Statement 2, wherein the method is performed by an operating system or file system on computer equipment of the user, the operating system or file system being configured to enforce said checks before enabling the user to perform the requested action using the computer equipment.

Statement 4: the method of Statement 2 or 3, wherein the requested action comprises one of: reading the file, modifying the file, executing the file, or deleting the file.

Statement 5: the method of Statement 2, 3 or 4, wherein the payload of the target child node further comprises an indication of one or more permitted actions, and the operating system or file system is configured to perform said enabling of the requested action only on further condition that the requested action is one of the permitted actions indicated in the target child node.

Statement 6: the method of Statement 5, wherein the one or more permitted actions comprises one or more of: reading the file, modifying the file, executing the file, or deleting the file.

Statement 7: the method of any of Statements 2 to 6, wherein the payload of the target child node further comprises an indication of one or more permitted users, and the operating system or file system is configured to perform said enabling of the requested action only on further condition that the user requesting the action is a permitted user indicated in the payload of the target child node.

Statement 8: the method of Statement 1 or 2, wherein the method is performed by antivirus software or another application in order to verify integrity of the current instance of the file.

Statement 9: the method of any preceding Statement, wherein the key associated with each respective parent node is associated with the parent by being included in a payload of the parent node.

Statement 10: the method of any preceding claim, wherein each transaction comprises at least one output comprising a locking script, and at least one input which points to an output of a respective other transaction and which comprises an unlocking script for unlocking the output of the respective other transaction.

Statement 11: the method of Statement 10, wherein the input of each child is signed by the key of the respective parent, and A) comprises checking that the input of each child node along said path is signed by the key of the respective parent.

Statement 12: the method of Statement 10 or 11, wherein the payload of each child node is included in one or more of the outputs of the respective child node.

Statement 13: the method of any preceding Statement, wherein said record comprises at least an explicit copy of the file, and wherein B) comprises checking that the current instance of the file is the same as the copy recorded in the payload of the target child node.

Statement 14: the method of any preceding Statement, wherein said record comprises at least a hash of a preimage, wherein the preimage comprises the file, and wherein B) comprises at least checking that the hash of a current instance of the preimage comprising the current instance of the file is the same as the hash recorded in the payload of the target child node.

Statement 15: the method of any preceding Statement, wherein said record comprises a hash tree root of a hash tree, generated from a plurality of files as leaves of the hash tree wherein said file is one of the plurality of files; and wherein B) comprises checking that the hash root computed from a current instance of the plurality of files is the same as the hash root recoded in the target child node.

Statement 16: the method of any preceding Statement, wherein at least one of said parent nodes is an intermediate parent node being a child node of another of said parent nodes.

Statement 17: the method of Statement 16, wherein said at least one intermediate parent node includes at least one node along said path between the target child node and the root node, such that said path comprises more than one edge.

Statement 18: the method of Statement 17, wherein said at least one intermediate parent node comprises a folder node representing a folder containing the file.

Statement 19: the method of Statement 17, wherein said at least one intermediate parent node comprises a user node, wherein the key associated with the root node is a key of a system administrator and the key associated with the user node is a key of a user.

Statement 20: the method of any preceding Statement, wherein said checks comprise an additional check, C) checking that the root node is signed by a trusted entity; said verifying being further conditional on the check C) being positive.

Statement 21: the method of Statement 20, wherein said trusted entity is a system administrator.

Statement 22: the method of Statement 20 or 21, as dependent on at least Statement 10, wherein an input of the root node is signed by the trusted entity, the check C) comprising checking that input of the root node is signed by the trusted entity.

Statement 23: the method of any preceding Statement, wherein said checks comprise a further check, D) checking that the target child node is not a parent node of any other child nodes of the graph structure; said verifying being further conditional on the check D) determining that the target child node is not a parent of any of the other child nodes.

Statement 24: the method of Statement 23, comprising subsequently updating the file as recorded in the graph structure on the blockchain, by appending a new child node to the target child node via a new edge, the new child node comprising a record of the updated file in a payload of the new child node.

Statement 25: the method of any preceding Statement, wherein the target child node further specifies an expiry time of the record; and wherein said checks comprises another check, E) checking that the record has not expired in that a current time is not later than the expiry time specified in the target child node; said verifying being further conditional on said check E) determining that the current time has not expired.

Statement 26: the method of any preceding Statement, wherein the tree structure is a Metanet graph.

Statement 27: a computer system comprising: processing apparatus comprising one or more processing units, and memory comprising one or more memory units; wherein the memory stores code arranged to run on the processing apparatus, the code being configured so as when run on the processing apparatus to perform operations in accordance with any preceding Statement.

Statement 28: a computer program embodied on computer-readable storage, the computer program comprising code configured so as when run on one or more processing units to perform operations in accordance with any of Statement 1 to 27.

Other variants or applications of the disclosed technology may become apparent to a person skilled in the art once given the disclosure herein. The scope of the present disclosure is not limited by the above-described embodiments but only by the appended claims.

The invention claimed is:

1. A method of using a tree structure overlaid on a blockchain maintained across servers of a blockchain network, the tree structure comprising a plurality of nodes and edges between nodes, wherein each node is a different transaction recorded on the blockchain, and each edge connects from a respective child node to a respective parent node, the edges being formed by each transaction comprising a transaction ID and each child node specifying the transaction ID of the respective parent node in a respective payload of the child node, and wherein one of the parent nodes is a root node of the tree structure; the method comprising, performed by an operating system, file system or antivirus software on client user equipment being a client of the blockchain network:

at request of a user of the client user equipment, instigating a requested file operation to be performed on a current instance of a file stored locally on the client user equipment, the requested file operation comprising at least one of reading the file, modifying the file, executing the file, or deleting the file; and in response to the instigation of the requested file operation:
inspecting the blockchain to identify at least part of the tree structure, including at least identifying a target one of the child nodes which includes a record of a reference instance of the file recorded in the respective payload of the target child node, and identifying a path comprising one or more edges back through the tree structure from the target child node to the root node;

performing checks comprising:
- A) for each edge along the identified path from the target child node back to the root node, checking that the respective child node is signed by a key associated with the respective parent node, and
- B) checking that the current instance of the file stored locally on the client user equipment matches the record of the reference instance included in the target child node;

verifying the current instance of the file at least on condition that checks A) and B) are positive; and enabling the user to perform the requested file operation on the current instance of the file on condition of said verifying, and based on said enabling performing the requested file operation locally on the client user equipment.

2. The method of claim 1, wherein the payload of the target child node further comprises an indication of one or more permitted file operations, and the operating system or file system is configured to perform said enabling of the requested file operation only on further condition that the requested action is one of the permitted file operations indicated in the target child node.

3. The method of claim 2, wherein the one or more permitted file operations comprises one or more of: reading the file, modifying the file, executing the file, or deleting the file.

4. The method of claim 1, wherein the payload of the target child node further comprises an indication of one or more permitted users, and the operating system or file system is configured to perform said enabling of the requested file operation only on further condition that the user requesting the file operation is a permitted user indicated in the payload of the target child node.

5. The method of claim 1, wherein the key associated with each respective parent node is associated with the parent by being included in a payload of the parent node.

6. The method of claim 1, wherein each transaction comprises at least one output comprising a locking script, and at least one input which points to an output of a respective other transaction and which comprises an unlocking script for unlocking the output of the respective other transaction.

7. The method of claim 1, wherein said record comprises a hash tree root of a hash tree, generated from a plurality of files as leaves of the hash tree wherein said file is one of the plurality of files; and wherein B) comprises checking that the hash root computed from a current instance of the plurality of files is the same as the hash root recoded in the target child node.

8. The method of claim 1, wherein at least one of said parent nodes is an intermediate parent node being a child node of another of said parent nodes.

9. The method of claim 8, wherein said at least one intermediate parent node includes at least one node along said path between the target child node and the root node, such that said path comprises more than one edge.

10. The method of claim 9, wherein said at least one intermediate parent node comprises a folder node representing a folder containing the file.

11. The method of claim 9, wherein said at least one intermediate parent node comprises a user node, wherein the key associated with the root node is a key of a system administrator and the key associated with the user node is a key of a user.

12. The method of claim 1, wherein said checks comprise an additional check, C) checking that the root node is signed by a trusted entity; said verifying being further conditional on the check C) being positive.

13. The method of claim 6, wherein:
said checks comprise an additional check, C) checking that the root node is signed by a trusted entity; said verifying being further conditional on the check C) being positive; and
an input of the root node is signed by the trusted entity, the check C) comprising checking that input of the root node is signed by the trusted entity.

14. The method of claim 1, wherein said checks comprise a further check, D) checking that the target child node is not a parent node of any other child nodes of a graph structure; said verifying being further conditional on the check D) determining that the target child node is not a parent of any of the other child nodes.

15. A client computer system comprising:
processing apparatus comprising one or more processing units, and
memory comprising one or more memory units;
wherein the memory stores code arranged to run on the processing apparatus, the code being configured so as when run on the processing apparatus, the processing apparatus performs a method of using a tree structure overlaid on a blockchain maintained across servers of a blockchain network, the tree structure comprising a plurality of nodes and edges between nodes, wherein each node is a different transaction recorded on the blockchain, and each edge connects from a respective child node to a respective parent node, the edges being formed by each transaction comprising a transaction ID and each child node specifying the transaction ID of the respective parent node in a respective payload of the child node, and wherein one of the parent nodes is a root node of the tree structure; the client computer system being a client of the blockchain network and taking the form of a user equipment, and the method comprising, by filesystem software, operating system software or antivirus software run on the client computer system:
at request of a user of the client computer system, instigating a requested file operation to be performed on a current instance of a file stored locally on the client computer system, the requested file operation comprising at least one of reading the file, modifying the file, executing the file, or deleting the file; and
in response to the instigation of the requested file operation:
inspecting the blockchain to identify at least part of the tree structure, including at least identifying a target one of the child nodes which includes a record of a reference instance of the file in the respective payload of the target child node, and identifying a path comprising one or more edges back through the tree structure from the target child node to the root node;
performing checks comprising:
- A) for each edge along the identified path from the target child node back to the root node, checking that the respective child node is signed by a key associated with the respective parent node, and B) checking that the current instance of the file stored locally on the client computing system matches the record of the reference instance included in the target child node; and verifying the current instance of the file at least on condition that checks A) and B) are positive; and enabling the user to perform the requested file operation on the current instance of the file on condition of said verifying, and based on said enabling performing the requested file operation locally on the client computer system.

16. A computer program embodied on a non-transitory computer-readable storage medium, the computer program comprising code configured so as when run on one or more processing units on a client computing system, the one or more processing units perform a method of using a tree structure overlaid on a blockchain stored on servers of blockchain network, the tree structure comprising a plurality of nodes and edges between nodes, wherein each node is a different transaction recorded on the blockchain, and each edge connects from a respective child node to a respective parent node, the edges being formed by each transaction comprising a transaction ID and each child node specifying the transaction ID of the respective parent node in a respective payload of the child node, and wherein one of the parent nodes is a root node of the tree structure; the computer program being an operating system, file system or antivirus software, and the method comprising:

at request of a user of the client computer system, instigating a requested file operation to be performed on a current instance of a file stored locally on the client computer system, the requested file operation comprising at least one of reading the file, modifying the file, executing the file, or deleting the file; and in response to the instigation of the requested file operation:

inspecting the blockchain to identify at least part of the tree structure, including at least identifying a target one of the child nodes which includes a record of a reference instance of the file in the respective payload of the target child node, and identifying a path comprising one or more edges back through the tree structure from the target child node to the root node;

performing checks comprising:

A) for each edge along the identified path from the target child node back to the root node, checking that the respective child node is signed by a key associated with the respective parent node, and B) checking that the current instance of the file stored locally on the client computer system matches the record of the reference instance included in the target child node;

verifying the current instance of the file at least on condition that checks A) and B) are positive; and enabling the user to perform the requested file operation on the current instance of the file on condition of said verifying, and based on said enabling performing the requested file operation locally on the client computer system.

* * * * *